United States Patent [19]

Criswell

[11] Patent Number: 5,217,187
[45] Date of Patent: * Jun. 8, 1993

[54] MULTI-USE LAUNCH SYSTEM

[76] Inventor: David R. Criswell, 4003 Camino Lindo, San Diego, Calif. 92122

[*] Notice: The portion of the term of this patent subsequent to May 30, 2006 has been disclaimed.

[21] Appl. No.: 349,840

[22] Filed: May 9, 1989

Related U.S. Application Data

[63] Continuation-in-part of Ser. No. 883,979, Jul. 10, 1986, Pat. No. 4,834,324, which is a continuation-in-part of Ser. No. 548,949, Nov. 7, 1983, abandoned.

[51] Int. Cl.$^5$ .............................................. B64G 1/14
[52] U.S. Cl. ............................... 244/158 R; 244/172; 244/2
[58] Field of Search .................... 244/158 R, 162, 172, 244/2, 160, 161

[56] References Cited

U.S. PATENT DOCUMENTS

| | | | |
|---|---|---|---|
| 3,202,381 | 8/1905 | Wuenscher | 244/172 |
| 3,261,571 | 7/1966 | Pinnes | 244/1 |
| 3,295,790 | 1/1967 | Webb | 244/1 |
| 3,369,771 | 2/1968 | Walley et al. | 244/162 |
| 3,702,688 | 11/1972 | Faget | 244/162 |
| 3,866,863 | 2/1975 | von Pragenau | 244/162 |
| 3,929,306 | 12/1975 | Faget et al. | 244/162 |

FOREIGN PATENT DOCUMENTS

| | | |
|---|---|---|
| 2331607 | 1/1974 | Fed. Rep. of Germany ... 244/158.4 |
| 1044780 | 12/1963 | United Kingdom . |

OTHER PUBLICATIONS

Titan III Commercial Launch Services, Martin Marietta Brochure, 1987.
"Expendable Solid and Reusable Liquid Systems in Post-Saturn Propulsion", P. Bono, Jan. 1970, pp. 31–53.
"Easing of Shuttle Weight Limits Key to New USAF Upper Stage", Bruce A. Smith, Jan. 1987, p. 25.
"Air Launched Shuttle Concepts", Peebles, *Journal of the British Interplanetary Society*, 1983.
"An Approach to Economic Space Transportation", Smith, *Aircraft Engineering*, 1966.
"Space Shuttle/The New Baseline", Malkin, *Astronautics and Aeronautics*, Jan. 1974.
I. O. MacConochie et al., *Engineering Note*, Jun. 18, 1976.
Space Industrialization vol. II (1980), p. 156, *Space Transportation*, H. P. Davis.
NASA SP-387, Section II, "Energy for Earth to Orbit Operations–A Forecast of Space Technology 1980–2000", Jan., 1976.
J. A. Martin et al., *The Orbit-On-Demand and Shuttle II Studies at NASA Langley*, pp. 221–222, (1987).

Primary Examiner—Galen Barefoot
Attorney, Agent, or Firm—Brown, Martin, Haller and McClain

[57] ABSTRACT

A multi-use launch system comprises a plurality of different modules releasably securable together into a plurality of different possible launch configurations. The modules include an at least partially expendable, unmanned first stage unit which is capable of single-stage-to-orbit operations on its own carrying internal or external payloads, or as part of a multi-stage-to-orbit system for higher payload capacity launches. The first stage unit is demountably securable to other first stage units, unpowered cargo-carrying units, and/or manned space vehicles. The first stage unit may be completely expendable after launch.

14 Claims, 3 Drawing Sheets

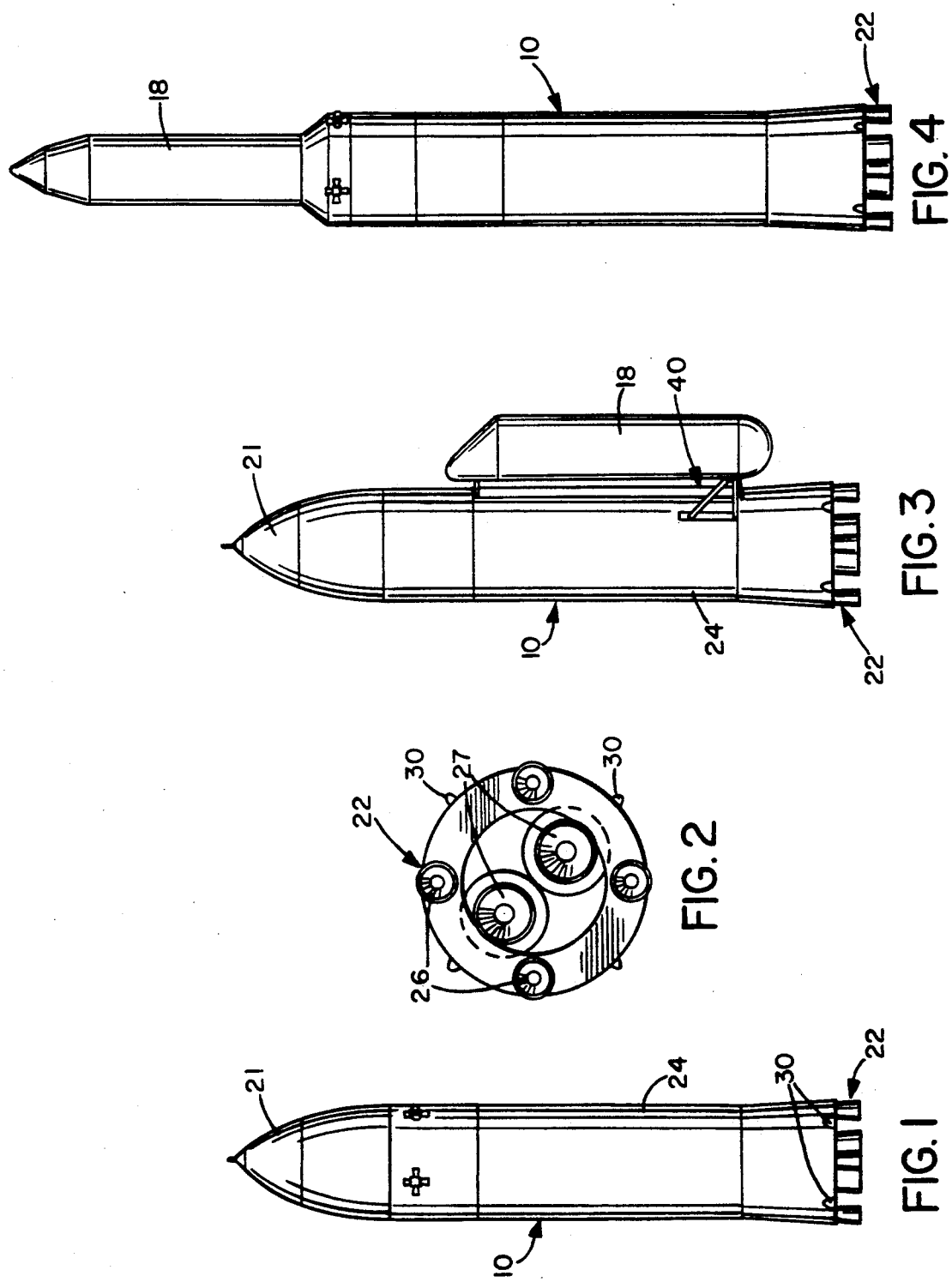

MULTI-USE LAUNCH SYSTEM

This application is a continuation-in-part of application Ser. No. 06/883,979 Jul. 10, 1986, now U.S. Pat. No. 4,834,324, which was a continuation-in-part of application Ser. No. 548,949 filed Nov. 7, 1983, now abandoned.

TECHNICAL FIELD

The present invention relates to systems and methods for launching vehicles into outer space. More particularly, the present invention relates to systems having propulsive devices in combination with a space shuttle-like orbital vehicle or other payload-carrying vehicle.

BACKGROUND ART

The space age is barely two decades old, but the steps taken during that time have created unparalleled opportunities for the exploration and use of outer space. The space shuttle has been a step which has greatly facilitated this opportunity.

The space shuttle is a versatile vehicle having the essential characteristics of a spacecraft; yet is, in some respects, similar to an aircraft. The shuttle ascends into outer space with the assistance of rockets just as does the conventional spacecraft and descends from outer space, in a manner reminiscent of the landing of an aircraft, by gliding through the atmosphere and landing on a runway. The development of the shuttle is a significant achievement because it marks the advent of a rudimentary space transportation system. The system is expected to enable man and cargo to "shuttle" routinely to and from outer space, thereby making it possible to service, repair and resupply spacecraft, to build larger structures, such as industrial facilities, and eventually to construct settlements in outer space.

In a technical sense, the space shuttle is made up of an orbiter containing the shuttle main engines, an external tank containing the ascent propellant used by the orbiter's main engines, and two solid rocket boosters. The orbiter and the solid rocket boosters are reusable, while the external tank is expendable on each launch. At launch, the two solid rockets and the orbiter's three liquid rocket engines ignite and burn simultaneously. The orbiter, with its crew and payload, remains in orbit to carry out a mission, normally for about seven days, but when required for as long as thirty days. When the mission is completed, the orbiter returns to Earth and lands like an airplane.

While the space shuttle marks a major step forward in the development of outer space, there are a number of problems which prevent the most effective, economical and efficient method of operating such a shuttle system. Heretofore, the prior art shows little effort to refine the space shuttle to provide greater flexibility.

One of the main problems with the space shuttle is that the orbiter, the spacecraft which looks like a Delta-winged airplane about the size of a DC-9 jetliner, must attach to an external tank and systems and also contain three liquid rocket engines and their associated systems. The fuel container, residual fuels at termination of the primary burn, and the rocket engines add a considerable amount of mass to the total going into or approaching orbit.

Furthermore, and even more importantly, the engines and the fuel arrangement minimize the amount of cargo space within the orbiter. This means that smaller and lighter payloads are required. Although the orbiter can deliver up to 25 tons of internal payload to orbit, the internal payload is only 1/7 of the total mass placed into orbit.

Another problem with the shuttle system is lack of versatility since it provides essentially only one type of space mission with quite limited size and mass capabilities. Thus, mission models must be designed with the shuttle capabilities in mind, and designs must be confined to meet the shuttle requirements. Space shuttle orbiters contain both the payload bay and the main engines. Since they are both expensive and complex to build, there will normally be relatively few orbiters in operation at any one time. Transport to space is limited when orbiters are inoperative for maintenance or while they are in orbit. Thus, for example, orbiters cannot be used for long duration manned space missions without severely restricting launch capacity. They must be brought back to earth quickly to support launch operations. This constrains in-orbit research and could critically limit the delivery and assembly of space station or other major space projects.

These and other problems are currently being encountered by the space shuttle. In times when money was unlimited for the space program, it may have been unnecessary to exercise efficiency and economy with the projected operation of such a shuttle program. But today, in view of the limited budgets for space exploration, and the need for private enterprise space exploration, the efficiency and economy problems associated with space shuttle operation and further development are impossible to ignore.

In my co-pending application Ser. No. 06/883,979, now U.S. Pat. No. 4,834,324, referred to above, a versatile, multi-configuration reusable space transportation system is described in which a plurality of modules are provided which can be connected together in various possible configurations according to the particular mission requirements. The core of the system is a first stage propulsion unit which is selectively usable as an independent, single-stage-to-orbit vehicle or as one stage of a multiple stage configuration. The first stage unit is re-usable and has a fly-back arrangement for return to Earth.

SUMMARY OF THE INVENTION

The present invention relates to a multi-configuration space transportation system for selectively transporting different mass payloads into space, the system comprising a plurality of different modules which can be releasably secured together in a number of different possible configurations.

The modules include a first stage unit which is at least partially expendable and contains a primary propulsion device for providing sufficient thrust to propel payloads up to a predetermined mass into or close to orbit, a payload unit for containing payloads, and at least one second stage or auxiliary unit for selectably securing to the rest of the system, including a secondary propulsion device for providing additional thrust for propelling larger mass payloads into orbit or for boosting payloads into deep space. Each of the units can be secured alone to any of the other units, and several units of the same type may be used in selected launch configurations. The payload unit may comprise a simple, unpowered payload canister or pod secured externally or internally to the first stage unit, or may comprise an orbital vehicle for manned orbit including cargo space and orbital maneuvering devices or engines. Both types of payload unit are preferably provided as modules on the system. The second stage units are booster devices or rockets of much smaller dimensions than the first stage units which provide the primary propulsive power.

The first stage unit preferably includes cargo space and is preferably usable as a single-stage-to-orbit vehicle as well as part of various multiple stage configurations. The unit is completely or at least partially expendable after launch. If desired, the motors and electronics may be jettisoned as the unit falls back to Earth and may be recovered by suitable parachute deployment, for example. However, in the simplest case, the entire unit is expendable and lost after launch is completed. Where it is used as a single-stage-to-orbit (SSTO) vehicle, it will typically carry a small payload into orbit, release the payload, and either remain in orbit or subsequently fall back to Earth.

The first stage unit in the preferred embodiment of the invention is in the form of a simple, cylindrical fuel tank of a type similar to the present space shuttle external tank and incorporating liquid fuel engines, but having additional internal cargo space. The unit has various attachment points for selectively securing it to a payload canister, orbital vehicle, secondary propulsion units, or to other first stage units for increased payload capacity. The attachment points in the preferred embodiment will be similar to those currently provided in a standard space shuttle launch system. The unit will preferably also have its own internal cargo or payload space, and is arranged for unmanned flight when used as a SSTO.

In the preferred embodiment the first stage unit has between three to eight fuel engines, which may be of equivalent power to the currently used space shuttle main engines (SSME), all located at the aft end of the first stage unit. The fore end contains the liquid propellants tanks. Other fuels may be used to provide the required propulsive power in alternative embodiment. This relatively simple and expendable core launch vehicle will provide a wide variety of launch and mission capabilities at relatively low expense. Two or more such core vehicles may be secured together for increased payload capacity.

With this arrangement, an orbital vehicle of a similar type to the current shuttle orbiter but without the heavy mass and high volume shuttle main engines can be boosted into space. The orbital vehicle can separate from the first stage unit at any time and the first stage unit can then be returned to Earth and reused when necessary. Thus the orbital vehicle can remain in space for longer periods and will have greater payload capacity since the shuttle main engines are eliminated from the vehicle. The vehicle will have increased OMS (orbital maneuvering system) propellant over standard space shuttle orbiters and a longer payload bay, allowing a greater volume payload to be transported into space.

For increased payloads and deep space transportation, a secondary or auxiliary propulsion unit may be used. This may be in the form of solid fuel booster rockets secured to the first stage unit, or in the form of external Centaurs or rockets which may be attached either to the first stage unit or to an orbital vehicle launched by the first stage unit. The auxiliary units may be hydrogen and oxygen rockets or rockets containing any suitable propellant, and are preferably also expendable.

Thus, one possible configuration of the system of this invention comprises a single first stage unit incorporating a payload for launching into orbit. In this case the first stage unit may include either an internal payload space or external payload pods secured to the tank.

Another configuration would consist of a first stage unit demountably attached to a modified orbital vehicle, for launching a manned flight into space. The orbital vehicle may have auxiliary propulsion units in the form of wing tanks or rockets releasably secured to its wings. Fuel connections may be provided between the first stage fuel tank and the wing tanks during launch. The first stage unit will boost the system close to orbit and will then separate and fly back to the launch site. The external rockets would then take the payload on into orbit. The propellant may be transferable from one external rocket to the other.

Another option is a combination of the first stage vehicle with suitable auxiliary devices, for example solid rocket boosters of the type currently used with the shuttle system, or auxiliary external booster rockets having a suitable propellant for enabling the first stage vehicle to accommodate heavier payloads. In a modified arrangement, two or more first stage units could be arranged in cylindrical, parallel burn configurations by providing suitable propellant cross-feeds as is currently done in the space shuttle system. A multiple first stage system of this type could be used with additional boosters or external units for additional propulsive force, and could be operated as a multi-stage vehicle to boost very large payloads. Payloads or payload canisters could be suitably externally attached to the first stage units, or carried internally in suitable payload compartments. In an alternative arrangement for launching a large payload canister, several cross-fed, first stage units may be clustered around the canister and fired in parallel burn or staged fashion to launch the canister into orbit.

Thus the proposed modular, multi-vehicle space transportation system is relatively simple, flexible, and allows various payload weights to be transported into orbit or deep space with suitable choice of units to be releasably secured together. Instead of specially designing an entire new rocket or propulsion system for each new payload or mission requirement, an existing modular system can be used by simply attaching the required modules together for launch. The units in the preferred embodiment are expendable, apart from any manned orbital vehicle, making launches less complex and the individual vehicle design less complex and thus less expensive. The revised orbiters, which do not include the main engines, are less expensive to produce and thus more can be made available, improving transport availability and allowing orbiters to remain in space for longer periods of time without severely restricting launch capacity.

BRIEF DESCRIPTION OF THE DRAWINGS

The present invention will be better understood from the following detailed description of some preferred embodiments of the invention, taken in conjunction with the accompanying drawings in which like reference numerals refer to like parts and in which:

FIG. 1 is a side elevation view showing the basic core or first stage unit of the multi-use launch system according to one embodiment of the present invention;

FIG. 2 is an end view of the first stage unit of of FIG. 1, showing the engine arrangement;

FIG. 3 is a side elevation view of the first stage unit staged to an external tank or payload unit;

FIG. 4 illustrates an alternative nose mounting of the payload unit;

DESCRIPTION OF THE PREFERRED EMBODIMENTS

Figure 7:
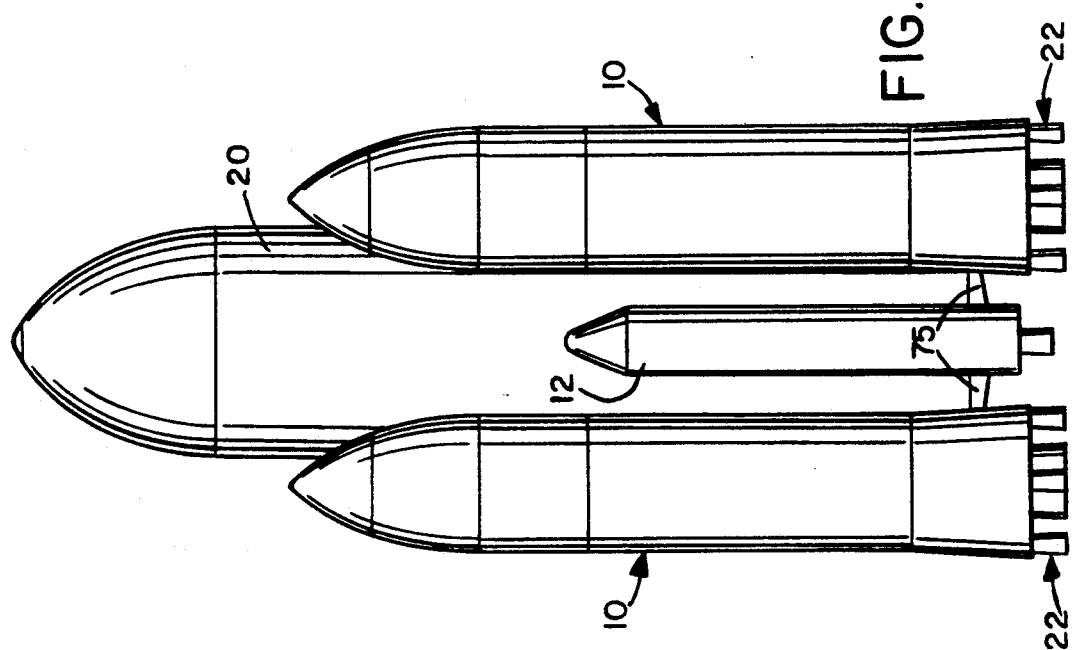
FIG. 7 is a side elevation view of another configuration of the launch system in which a parallel arrangement of first stage units is used to launch a payload canister into space.

FIGS. 1 and 2 of the drawings illustrate a basic first stage launch or core unit 10 of a multi-use launch system according to a preferred embodiment of the present invention. The unit 10 is at least partially or fully expendable or one-shot (in other words, there is no arrangement for recovery of the unit after launch), and may be used as a single-stage-to-orbit vehicle as illustrated in FIG. 1, or may be selectively attached to various other units or modules of the system in many possible alternative launch configurations, including those illustrated in the drawings.

The modular units of the system illustrated in the drawings include the first stage or core unit 10, auxiliary propulsion devices comprising solid rocket boosters 12 which are demountably attachable to first stage unit 10 (see FIGS. 6 and 7), an orbital vehicle 14 (see FIG. 9) another type of auxiliary propulsion device comprising detachable wing tanks or external rockets 16 (FIG. 9) and unpowered cargo pods or units 18,20 of various sizes (FIGS. 3 to 5, 7 and 8). These modular units are usable in various possible launch and orbital configurations as described in more detail below, according to the required payload and transportation. The payload canister or cargo pod 18,20 is an unmanned container for holding a payload and which can preferably be demountably attached to the first stage unit in a similar manner to the other vehicles of the system. The payload canister may be provided in various sizes, two of which are illustrated in the drawings.

Thus each of the modular units can be demountably attached to any of the other units according to the desired launch configuration and payload mass. Each type of modular unit of the system will now be described in more detail.

The first stage unit 10 is a reusable booster rocket which is capable of single-stage-to-orbit operations. It is similar in appearance to the current shuttle system external tank. As best seen in FIG. 2, the rear end of the first stage unit 10 accommodates six engines 22. The main body 24 of unit 10 is generally cylindrical, with the forward end 21 being of generally conical shape.

The engines 22 are designed to provide sufficient thrust to convey the vehicle to the desired orbit. The engines 22 are high thrust engines, and may be a similar or identical type to the current space shuttle main engines (SSME) provided in the shuttle orbiter. The launch vehicles may have up to eight main engines for increased payload capability. The engine 22 may utilize any suitable propellant, and the unit 10 has suitable propellant tanks provided in its cylindrical body area 24. The propellant tanks may comprise separate areas for containing liquid oxygen, liquid hydrogen, solid or liquid hydrocarbon fuel, or any other appropriate propellant combination for launching payloads into space. In the preferred arrangement the main engines use liquid hydrogen and oxygen as a propellant, as do the space shuttle main engines supplied from the external tank.

In the embodiment illustrated in FIG. 2, the engines 22 are of two different types, comprising an outer ring of four smaller boost engines 26 which are fixed engines used from launch up to a height of 30 to 40 miles, and two larger central core engines 27 with thrust vector control for space operation. The smaller engines may be SSME-35 or equivalent, while the larger engines are standard SSME or equivalent types of engines. Alternatively, six boost engines may be provided in the outer ring for increased capacity, or the unit may be "Atlas" staged with two or more core engines and two or more separate auxiliary boost engines which drop off after a predetermined height is attained. In another alternative, a smaller core vehicle may have a plurality of smaller, low thrust engines, such as RL-10 type or equivalent, which replace the engines 22 of FIG. 2, for example eight or more RL-10's can provide the SSTO launch capability.

Preferably, the first stage unit also includes a suitable cargo area 28 which may be arranged to carry freight.

The first stage unit is preferably compatible with existing attachment points of the space shuttle orbiter, solid rocket boosters, and launch pad. Launch stand mounts 30 are provided around the lower end of unit 10, as in the current shuttle system. An attachment area or interface 40 serves to connect the unit with payload unit 18, an orbital vehicle 14, or with other modular units of the system in alternative arrangements described in more detail below.

Two or more such attachment areas or interfaces are provided to allow the unit to be connected to one or more additional vehicles. Preferably, a nose mount attachment arrangement is also provided to allow a payload unit, for example, to be selectively mounted to one side of the launch vehicle 10 as illustrated in FIG. 3 or on the nose of the vehicle as in FIG. 4. The nose mounting will provide higher payload capacity. The side attachment method is preferably similar to that used on the present space shuttle, which is explained in detail in NASA publication SP-407, entitled "Space Shuttle". The interface is preferably arranged to provide the required interchangeable, releasable mechanical connection as well as two way communication of information, and propellant flow from one vehicle to another. An electrical or power interface may also be provided. Communication of information between the vehicles may be provided via a physical connection or remotely via radio. At the appropriate altitude, as explained in more detail below, the first stage unit 10 will separate from the orbital vehicle or other modular unit and normally fall back to Earth. Other attachment areas or interfaces of a similar nature (not shown in the drawings), are used for demountably attaching solid rocket boosters, external wing tanks or payload canisters around the first stage unit 10 in various possible system configurations. A suitable nose attachment area or interface 41 is provided for selectively demountably securing the payload unit on the nose of the vehicle, as illustrated in FIG. 4. This nose attachment interface will be of a standard type with all the necessary mechanical, electrical and fluid connections, but will be modified in a similar manner to the side interface to allow two-way instead of only one way flow or communications.

The first stage unit is preferably constructed to be completely expendable. However, it may be only partially expendable with the rockets and electronics separated and returned to Earth via parachute for recovery. In one specific example, the first stage unit may have a length of about 152 feet and a diameter of about 30.6 feet. The first stage unit is designed for use as the first stage or primary booster of a system for launching other units into orbit, or for use independently as a single stage to orbit vehicle. Thus it has sufficient propulsive power for independent launch or for use as a primary booster. The unit has an internal cargo space, and can have external cargo canisters or pods secured to it.

The expendable first stage unit is the core of the multi-use launch system of this invention. The other units of the system will now be described in more detail.

The solid rocket boosters 12 (see FIG. 6) are designed to be demountably attached to one or more first stage units via attachments or interfaces 42, to allow launching of heavier payloads into space. The same mounting areas or interfaces may be used to selectively attach either boosters 12 or payload units. The boosters 12 may be of the same general type as used in the current space shuttle. The boosters basically each comprise a cylindrical body 50 having a conical portion 52 at its forward end and an engine 56 located at its rear end. The engine is a suitable solid fuel propellant engine and serves to provide booster power during launch. The conical portion 52 of body 50 aids aerodynamic movement through the Earth's atmosphere and also may serve as a canister for a landing parachute for return of the booster to Earth. Alternatively, the units 12 may be expendable. The external surfaces may be covered with a suitable heat shield for re-entry protection.

The solid rocket booster units 12 are designed to be demountably attached to the first stage unit 10 by the same methods as are used in the present shuttle system. They may be used, for example, when oversize or extra heavy payloads are launched. Once the solid fuel propellant is exhausted, the booster units 12 separate from the first stage unit and fall back to Earth, where they are lost if expendable, or may be recovered and refueled for future use.

In alternative arrangements the solid rocket boosters may be replaced with suitable liquid fuel rockets of equivalent power, for example using liquid hydrocarbons, liquid oxygen and liquid hydrogen, or other suitable liquid fuel propellants. They may be of the Atlas type.

Figure 9:
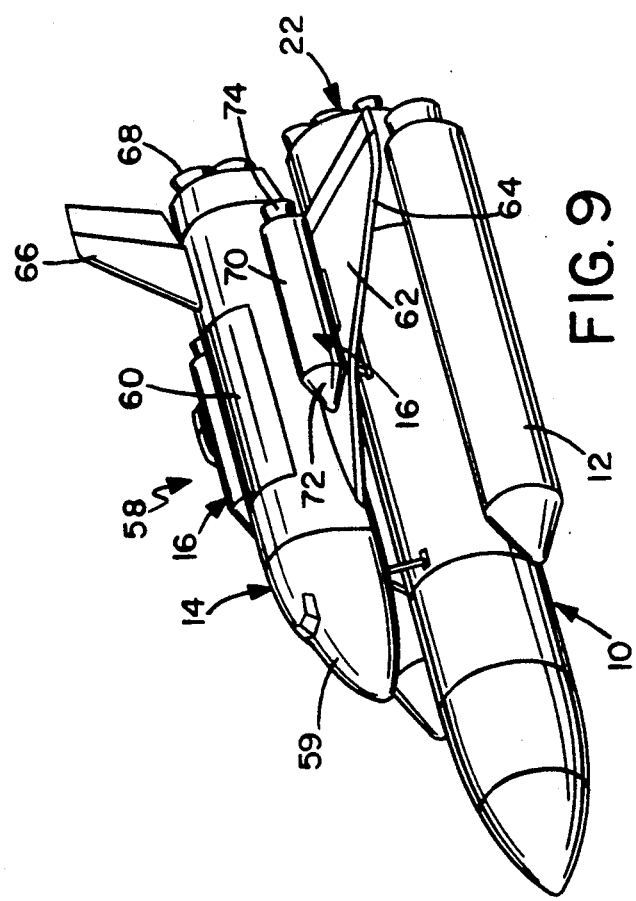
FIG. 9 is a perspective view of another possible launch configuration of the system employing a single first stage unit, orbital vehicle, and and booster units.

The orbital vehicle 14 illustrated in FIG. 9 is of a similar type to the current space shuttle orbiter, but excluding the three main shuttle engines and propellant space now provided in the rear of the shuttle orbiter. The propellant power of the three main engines is provided in this system in the first stage unit, and removal of these engines from the orbital vehicle greatly reduces the weight of the orbiter and leaves a greater volume for additional cargo. The orbital vehicle includes an orbital maneuvering system (OMS) 58 of a similar type to the present shuttle orbiter but with extra propellant for driving the vehicle into orbit.

The external body of the orbital vehicle 14 is very similar to the current shuttle orbiter, including a conical nose section 59 at the forward end which contains the control panels and piloting compartment, cargo area 60 where experiments are carried out, supplies are carried, and instruments are stored, and fixed wings 62. The cargo area is significantly longer than that of a conventional orbiter since the main engines and associated control and propellant space are excluded. Thus the cargo bay is extended to the aft loading doors. The cargo area has upper doors for exposing the area in space, as does the current space shuttle.

Wings 62 have an arcuate outer shape and extend tangentially from the cylindrical body portion of vehicle 14. A carbon-layered forward wing edge 64 runs along wings 62. A split rudder 16 extends upwardly at the rear end portion of the vehicle and is generally perpendicular to the plane of wings 62.

The orbital vehicle may be provided with a pivotal wing in place of fixed wings 62, which may be equivalent to swing wing 28 provided on the first stage unit. Pop out canards may also be provided. The orbital maneuvering system 58 comprises a suitable rocket engine or engines at the rear end of the vehicle which communicate with a nozzle or nozzles 68. The system 58 serves as a maneuvering thruster for vehicle 14 while in orbit or approaching orbit. It need not provide for any of the initial launch propulsion capability, although it may do so in some cases. The OMS may have any suitable propellant stored in tanks at the rear end of the vehicle, such as liquid hydrogen and oxygen. In the preferred arrangement, the OMS is equivalent to that provided on the current shuttle orbiter, but with extra OMS propellant.

The other type of modular unit shown in FIG. 9 is a different type of auxiliary unit comprising a wing tank or external rocket 16. In the arrangement shown in FIG. 1, a pair of these auxiliary units 16 are shown for demountably attaching to the wings of the orbital vehicle 14. However, they may alternatively be attached in a similar fashion to the first stage unit, as will be described in more detail below. The external Centaur units 16 are preferably liquid hydrogen and oxygen rockets which are primarily intended to attach to the payload but may have propellant cross-feeds from the first stage unit 10. The auxiliary unit may be of a similar type to the Centaur launch vehicle but of sufficient structural strength for external attachment during launch.

The external rocket or wing tank unit 16 is similar in appearance to the solid rocket booster 12 but is shorter and of much less weight than the booster 12. In the preferred arrangement they are 1/20th the dry weight of booster 12 and are intended to operate primarily from high altitude to space or as deep space boosters or supply vehicles. The once the fuel is exhausted, the units separate and are expended.

The external unit 16 has a generally cylindrical main body section 70 with a conical nose section 72 at its forward end and engine nozzle or nozzles 74 projecting from its rear end. The cross sectional configuration of external unit 16 will be generally the same as that of the first stage unit 10 as illustrated in FIG. 9. The interior of unit 16 contains a tank or separate tanks containing an adequate supply of propellant.

Figure 5:
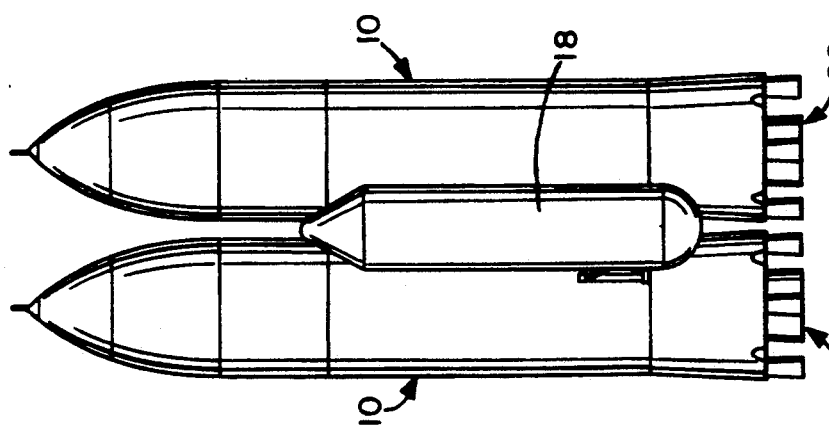
FIG. 5 illustrates an alternative launch configuration with two expendable core vehicles and a payload unit.
Figure 8:
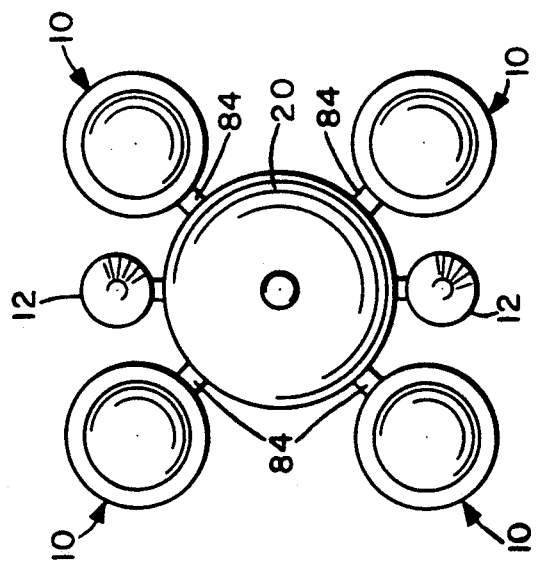
FIG. 8 is a top plan view of the configuration of FIG. 7.

Another optional modular unit of the system, which is illustrated in FIGS. 3, 4, 5, 7 and 8, is a payload unit or canister 18,20 which comprises a simple unpowered container for holding cargo to be launched into orbit or supplied to an orbiting vehicle or space station. Such a unit is demountably attachable to the first stage unit in an equivalent manner to the orbital vehicle 14. The payload units are suitably provided in various different sizes for different mass and weight payloads. A suitable payload unit 18 is illustrated in FIGS. 3, 4 and 5, and a larger payload unit 20 is illustrated in FIGS. 7 and 8.

The various units of the modular multi-use launch system can be optionally secured together in various different launch configurations according to the payload weight and particular mission characteristics, i.e. launch to orbit, launch to deep space, extended flights, space station operations, and so on. Some of the various possible system combinations are summarized in the table below, where FS refers to the first stage unit 10. Also included in Table 2 are estimated payload capacities.

TABLE 2
SYSTEM COMBINATIONS

| | Approx. payload (lbm) |
|---|---|
| 1. FS (6 SSME) side mount (FIG. 3) | 25,000 |
| 2. FS (6 SSME) nose mount (FIG. 4) | 50,000 |
| 3. Twin FS (6 SSME) (FIG. 5) | 214,000 (gross) |
| 4. FS (8 SSME) side mount | 64,000 |
| 5. FS (8 SSME) nose mount | 88,000 |
| 6. Twin FS (8 SSME) | 305,000 (gross) |
| 7. 1½ stage FS (i.e. with staged boost engines) | 67,000–130,000 |
| 8. FS with 8 RL-10 engines | approx. 6,000–10,000 |
| 9. Twin FS with 8 RL-10 engines/each | approx. 17,000 |

These and other possible combinations will now be described in more detail with reference to the drawings. FIGS. 1 and 2 illustrate use of the launch or core unit 10 alone as a SSTO vehicle. This will allow launch of an internally carried payload, for example a satellite, to be conveyed into space, with a payload mass dependent on the engine capacity of unit 10. With a core unit having more engines, a larger mass payload can be carried in the SSTO configuration.

FIG. 3 illustrates a single, side mounted payload unit or canister 18 attached to the first unit 10. This will allow launch of payloads from around 25,000 to 65,000 lbm, dependent on the engine capacity of the launch unit 10. If canister 18 is mounted on the nose of unit 10, as illustrated in FIG. 4, payload capacity is increased to between around 50,000 and 88,000 lbm due to reduced canister weight and payload supporting structure.

FIG. 5 illustrates an alternative configuration for launching very heavy payloads in which two launch units 10 are secured together in a parallel, side by side configuration with a single payload canister 18 secured between them. This increases the gross payload capacity to between 214,000 and 305,000 lbm, dependent on the number of SSMEs provided on the launch units. The payload support mass must be deducted from the gross payload capacity to obtain the net payload capacity. Preferably, first stage propellant cross feed (not visible in FIG. 5) is provided in the interface between the two units 10 for increased payload capacity. This arrangement provides significant payload gains.

Figure 6:
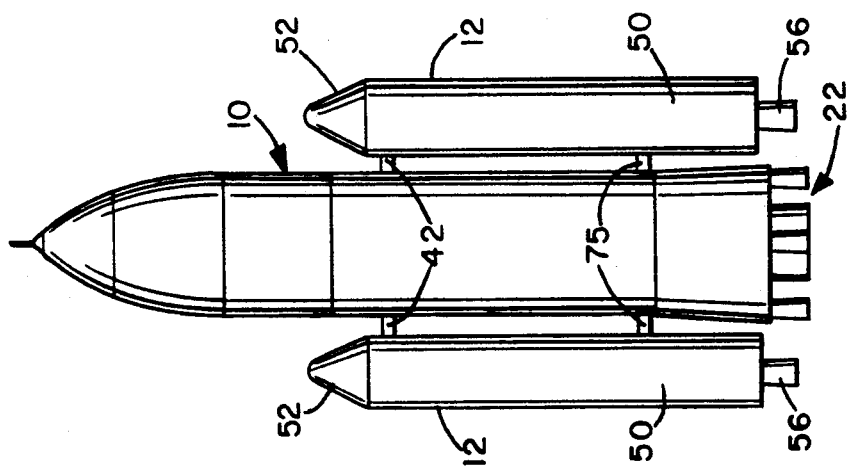
FIG. 6 is a side elevation view of another possible configuration of the system employing a first stage unit and two booster units.

FIG. 6 illustrates another potential launch configuration using a first stage or launch unit 10 and two auxiliary units 16. With this arrangement a first stage unit 10 carrying a heavier payload can be launched into low Earth orbit, for example. This is equivalent to a so-called 1½ stage (See Table 2, example 7 above).

FIGS. 7 and 8 illustrate an arrangement for launching relatively large and heavy payloads into orbit. In this arrangement, a parallel cluster of four first stage units 10 are used to launch a single massive payload canister 20. This type of configuration can be used as a multi-stage vehicle to boost very large payloads into orbit. Propellant cross feeds 75 may be provided in the interface between the first stage units, and the arrangement may also include two or more auxiliary propulsion units 12. All of these units are suitably demountably attached to the payload canister 20 by mounting devices illustrated schematically at 84. Canister 20 is of similar shape to the smaller payload unit 18, having a cylindrical body and generally conical nose portion.

FIG. 9 shows a launch combination comprising the first stage unit 10, orbital vehicle 14, and two external or wing tank units demountably attached to the lower faces of wings 62 of orbital vehicle 14.

In the arrangement illustrated in FIG. 9, the first stage unit 10 is intended to supply propellants to the auxiliary units (AUs) during launch by suitable propellant lines (not shown) and will separate from the orbital vehicle and auxiliary units at a few thousand feet per second short of orbit. Following separation, the FS will separate and fall back to Earth. The orbiter and wing tanks will then proceed to low Earth orbit. Calculations indicate that the orbital vehicle and two external wing tanks could achieve orbit with 100,000 lbs of payload and a total of approximately 40,000 lbs of propellant in the two wing tanks. Propellant could be transferred from one wing tank to the other. The wing tanks could be staged and returned to Earth when empty to be prepared for reuse.

In all possible configurations, the first stage unit and its main engines continue to provide thrust until the propellants are exhausted. Alternatively, the engines may be staged as described above. Propellants are supplied from suitable tanks within the unit to the engines during launch and travel of the system to close to orbital velocity. Excess propellant may be transferred to the external wing tank units 16, for example during or after launch.

The first stage unit separates from the orbital vehicle at a lower inertial velocity than in the corresponding operation of separation of the external tank from the orbiter in the current shuttle system. The unit 10 separates close enough to orbital velocity and altitude to enable the wing tanks 16 or enhanced orbital maneuvering system of the orbital vehicle to propel the vehicle into orbit.

Following separation of the orbital vehicle and external wing tank units, the units 16 provide thrust to boost the orbital vehicle into orbit. On achieving the final or transitional trajectory, the wing tank unit engines are shut down.

The wing tank or external rocket units are usable not only during transport to orbit operations, but additionally to transport small cargoes and/or propellant from Earth to users in space or to move cargo or propellants from one facility to another in space (e.g. from a low earth orbit space station to a GEO satellite). Cargo spaces for this purpose may be provided in the body section of the wing tank unit. The units 16 may also be designed to take cargo out of the orbital vehicle cargo bay, for example by hooking it to their nose section, and to transport it to another location. This may be particularly useful for construction of space stations and the like.

Additionally, fully fueled wing tank units may be provided in Earth orbit to attach to the orbital vehicle after launch. One, two, three or four such units may be attached to a single orbital vehicle in space to provide a fully loaded orbital vehicle with approximately 4,000, 8,000 or 12,000 feet per second velocity out of low Earth orbit. Thus the orbital vehicle combined with various reusable wing tank units can provide economical access to deep space. Most of the critical orbital vehicle consumables can be extended by using propellant from the attached wing tanks or by utilizing the enlarged cargo capacity of the vehicle resulting from the removal of the main engines. Thus much longer orbital missions or deep space missions can be accomplished. The auxiliary unit or wing tank may in alternative embodiments comprise a simple external propellant tank with no engine for supplying propellant to the orbiter OMS or other internal systems.

Although in the illustrated embodiment the first stage unit has six main engines having a suitable propellant such as liquid hydrogen and oxygen, any alternative engines and propellants for supplying the required thrust may be used, and a greater or lesser number of engines may be provided. In general, the first stage unit may have from three to ten engines. As mentioned above, propellant for the engines is stored in suitable tanks within the body 24 of the unit 10. Thus many small engines may be used in place of the main engines.

The expendable, unmanned first stage or core unit 10 which forms the core of a multi-use modular launch system is preferably usable both as a single stage to orbit vehicle and as a first stage booster to launch other payloads into or close to Earth orbit. Alternatively a smaller core unit may be designed to achieve close to Earth orbit alone, and be utilized with small boost rockets which drop off just after launch. Two or more smaller core units of this type may be linked together to launch payloads to orbit.

The core unit may be used alone or coupled with two or more additional first stage units, with or without auxiliary propulsion units, to provide a wide range of payload capacities. It may be used in a staged operation clustered about a cargo carrier or manned space vehicle. It may be combined with launch augmentors or upper stages, or used as an OTV/upper stage. The modified orbital vehicle for manned missions carries less non-payload mass into orbit than the present space shuttle system, and has a longer cargo bay. The orbital vehicle will have top cargo bay doors designed to swing open to allow experiments to be exposed during orbit, and to allow payloads to be extracted or placed in the cargo bay, and may have additional doors in the aft section of the cargo bay to provide access without opening the top cargo bay doors. It should be possible to accommodate fifteen to thirty foot longer payloads than in the present shuttle system. The shuttle body may be made completely tubular for improved strength. Since the dry weight of the orbital vehicle is much less and the aft cargo extension will create a low aerodynamic drag profile, the orbiter without payload should be a reasonably good aircraft. Detachable jet engines may be mountable on the wings and powered by hydrocarbon or hydrogen fuel stored in tanks in the cargo bay to permit operation of the vehicle as an aircraft. This greatly simplifies redeployment of orbital vehicles from one launch site to another.

The external auxiliary power or wing tank units may be secured when necessary to provide additional boost and maneuvering power to either an orbital vehicle or a first stage unit, while occupying no cargo bay space. They pose fewer hazards than if they were located internally in the orbital vehicle. The modular system also employs optional solid rocket boosters for added launch thrust.

The modular units of the system described above, apart from the orbiter, are all preferably fully or partially expendable and thus of relatively simple design. The units can be selected for a particular mission and suitably demountably secured together in the desired configuration, using the interfaces provided on the various units for this purpose. Because of the flexibility of this system, only a finite number of different types of modular units is required to support a wide variety of different operations, including launching of payloads from 20 to 30 tons up to over 100 tons, manned and unmanned flights, in-space transportation from site to site, missions to deep space, space station support, and many other potential missions. This system effectively de-couples the mission model from the rocket design. In other words, neither a mission nor a set of planned missions (i.e. a mission model) have to be designed around a specific, fixed capability launch system.

Thus, instead of having to redesign a space vehicle for each new mission, the appropriate modular units for supporting the mission are simply chosen from existing stock and connected together in the desired launch configuration. This makes space missions significantly less costly. Each unit of the modular system is capable of various uses, such as the first stage unit which can act either as a single stage to orbit vehicle with small payloads or as part of a multi-stage to orbit system with arbitrarily large payloads, and the external auxiliary power units which can act as boosters during launch, orbital transportation or maneuvering vehicles, or external engines on an orbiting vehicle, for example. Since the orbital vehicles are much simpler and less expensive than existing orbiters, it is possible that a larger fleet may be available and may be supported by a lesser number of first stage units which return to Earth after each launch for preparation to launch another orbital vehicle or other types of payload.

The system may be configured as a single stage to orbit system, a two stage system (first stage unit plus auxiliary units or SRBS), a three stage system (FS plus auxiliary unit plus SRB) and so on. Transportation costs to orbit are reduced with this system because of the modular design. Vehicles of special design characteristics do not have to be used for different types of missions. Instead, the required basic modules are selected from storage to accommodate a wide range of missions.

Although some preferred embodiments of the present invention have been described above by way of example, it will be understood by those skilled in the field that modifications may be made to the described embodiment without departing from the scope of the invention, which is defined by the appended claims.

I claim:

1. A multi-use launch system, comprising:
a plurality of generally cylindrical modules selectably securable together in a variety of different possible launch configurations, the modules including:
an at least partially expendable, unmanned first stage unit including primary propulsion means for boosting payloads up to a predetermined mass to a predetermined altitude and velocity, the primary propulsion means comprising means for selectively boosting the first stage unit alone from Earth into Earth orbit as a single-stage-to-orbit vehicle in one possible launch configuration;

a plurality of lateral securing means for selectively securing the first stage unit laterally to additional modules; and a payload carrying unit demountably and externally attachable to the first stage unit, the primary propulsion means further comprising means for selectively providing boost power to thrust a payload carrying unit secured to said first stage unit at least to an altitude close to orbit;

the different possible launch configurations including a first stage unit alone as a single-stage-to-orbit vehicle, a first stage unit attached to a selected number of identical first stage units, a first stage unit attached to a selected number of different modules, and a first stage unit attached to a selected number of identical first stage units and a selected number of different modules.

2. The system as claimed in claim 1, wherein the first stage unit includes additional securing means for selectively securing a payload carrying unit to the forward end of the first stage unit.

3. The system as claimed in claim 1, wherein the primary propulsion means comprises at least three engines at the rear end of the first stage unit.

4. The system as claimed in claim 3, wherein the engines comprise high thrust main engines.

5. The system as claimed in claim 3, wherein said engines comprise at least eight low thrust engines.

6. The system as claimed in claim 1, wherein the first stage unit is completely expendable after one launch.

7. The system as claimed in claim 1, wherein the first stage unit has internal cargo space.

8. The system as claimed in claim 1, wherein the first stage unit is selectively securable to a selected number of additional first stage units.

9. The system as claimed in claim 8, including propellant feed lines for securing between two attached first stage units.

10. The system as claimed in claim 1, including payload carrying units of various different sizes, each payload carrying unit being selectively securable to the first stage unit.

11. The system as claimed in claim 1, including two different types of first stage unit having different payload capacity, one type of first stage unit having a plurality of engines at its aft end and the other type having a larger number of engines at its aft end.

12. The system as claimed in claim 3, wherein the engines include at least two different types of engines having different thrust.

13. The system as claimed in claim 3, wherein the engines include at least one auxiliary boost engine which is dropped off after a predetermined height is reached.

14. A multi-configuration transportation system for selectively transporting a range of different mass and volume payloads into space and for conducting operations in space, comprising:

a plurality of different, generally cylindrical modules releasably securable together in a plurality of different possible launch configurations and space operation configurations;

the modules including:

a first stage unit containing primary propulsion means for providing thrust to said system for launching payloads from Earth up to a predetermined mass and volume to a predetermined altitude and velocity, the first stage unit having securing means for selectively securing said unit to a selected number of additional modules;

at least one auxiliary propulsion unit selectively securable to the other modules in said system, the auxiliary propulsion unit containing secondary propulsion means for providing auxiliary thrust to said system;

at least one unpowered cargo container selectively and releasably securable externally to said first stage unit, the container having internal cargo space for carrying cargo;

the first stage unit propulsion means further comprising means for selectively boosting the first stage unit alone from Earth into Earth orbit as a single-stage-to-orbit vehicle; and the launch configurations including configurations in which the first stage unit it secured to one or more identical first stage units, one or more different modules, and one or more identical first stage units in addition to one or more different modules.

* * * * *